(12) United States Patent
Han

(10) Patent No.: US 8,870,225 B2
(45) Date of Patent: Oct. 28, 2014

(54) SAFETY DEVICE FOR VEHICLE

(71) Applicant: Hyundai Motor Company, Seoul (KR)

(72) Inventor: Sung Jun Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 13/828,770

(22) Filed: Mar. 14, 2013

(65) Prior Publication Data

US 2014/0158808 A1  Jun. 12, 2014

(30) Foreign Application Priority Data

Dec. 12, 2012  (KR) .................. 10-2012-0144941

(51) Int. Cl.
*B60R 22/28* (2006.01)

(52) U.S. Cl.
USPC .......................................... 280/805

(58) Field of Classification Search
USPC ............ 280/805, 801.1, 806, 807, 808; 297/482, 483
See application file for complete search history.

(56) References Cited

U.S. PATENT DOCUMENTS

| | | | | |
|---|---|---|---|---|
| 5,732,974 A | * | 3/1998 | Sayles | 280/805 |
| 7,140,571 B2 | * | 11/2006 | Hishon et al. | 242/390.8 |
| 7,637,451 B2 | * | 12/2009 | Gentner et al. | 242/379.1 |
| 7,806,439 B2 | * | 10/2010 | Clute | 280/801.1 |
| 2004/0036345 A1 | * | 2/2004 | Herberg et al. | 297/480 |
| 2006/0091666 A1 | * | 5/2006 | Arnold et al. | 280/801.2 |
| 2008/0099594 A1 | * | 5/2008 | Hiramatsu | 242/379.1 |

FOREIGN PATENT DOCUMENTS

KR  10-2008-0053664  6/2008

* cited by examiner

*Primary Examiner* — Faye M. Fleming
(74) *Attorney, Agent, or Firm* — Edwards Wildman Palmer LLP; Peter F. Corless

(57) ABSTRACT

A safety device for a vehicle, which provides a more simple optimized mechanism to function as a load limiter having stable operation characteristics, and allows a reference load for releasing the webbing to vary depending on a change in collision speed, thereby providing increased protection to an occupant. More specifically, the safety device includes a roller, an electric generator, a magnetic force generator and a resistance generator. The roller comes in contact with a webbing and is configured to rotate with movement of the webbing. The electric generator generates electric current via the rotation of the roller, and the magnetic force generator generates a magnetic force via the electric current generated by the electric generator. The resistance force generator provides a resistance force to the rotation of the roller based on a shear force altered by the magnetic force generated by the magnetic force generator.

6 Claims, 6 Drawing Sheets

SAFETY DEVICE FOR VEHICLE

CROSS-REFERENCE TO RELATED APPLICATION

This application claims under 35 U.S.C. §119(a) the benefit of Korean Patent Application No. 10-2012-0144941 filed Dec. 12, 2012, the entire contents of which are incorporated herein by reference.

BACKGROUND

1. Field of the Invention

The present invention relates to a safety device for a vehicle and, more particularly, to a device for controlling behavior of a seat belt in the event of a vehicle collision or accident.

2. Description of the Related Art

In general, to prevent an excessive impact from being applied to a driver by a constraint force of a seat belt webbing in the event of a vehicle collision, a load limiter for releasing a fixed amount of the webbing when an operation load above a reference value is applied to the webbing is typically installed on a seat belt in a vehicle. The load limiter of the vehicle is a system that is applied to the seat belt along with a pretensioner and thereby doubly protects a driver along with an airbag. The load limiter may be applied to the seat belt in various types of operation structures.

Conventionally, the load limiter is generally mounted in the vehicle so as to meet specific speed regulations. Thereby, when the vehicle has a collision while traveling at the specific speed, the load limiter provides proper operability. However, the load limiter does not provide optimized performance at speeds other than the specific speed, and thus fails to be effective in reducing the chance of an injury to an occupant in those instances.

For instance, the mechanism shown in FIG. 1, is thought to be unreliable because an overshoot phenomenon may occur in which an applied load exceeds a reference load, causing the webbing to be released when the applied load is higher than the reference load. Alternatively, a lock dip phenomenon may occur, causing the webbing to be released at a fixed amount in the initial stage of the operation of the seat belt.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to provide a safety device for a vehicle, which provides a more simple optimized mechanism to function as a load limiter having stable operational characteristics, and allows a reference load used for releasing the webbing to vary depending on a change in collision speed, thereby providing increased protection to an occupant.

In order to achieve the above object, according to an aspect of the present invention, there is provided a safety device for a vehicle, which includes: a roller, coming in contact with a webbing and configured to rotate with movement of the webbing; an electric generator configured to generate electric current by the rotation of the roller; a magnetic force generator configured to generate a magnetic force via the electric current generated by the electric generator; and a resistance force generator configured to provide a resistance force to the rotation of the roller based on a shear force altered by the magnetic force generated by the magnetic force generator.

According to the present invention, the safety device provides a more simple optimized mechanism to function as a load limiter having stable operation characteristic, and allows a reference load for releasing the webbing to vary depending on a change in collision speed, so that it can provide increased protection to an occupant.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
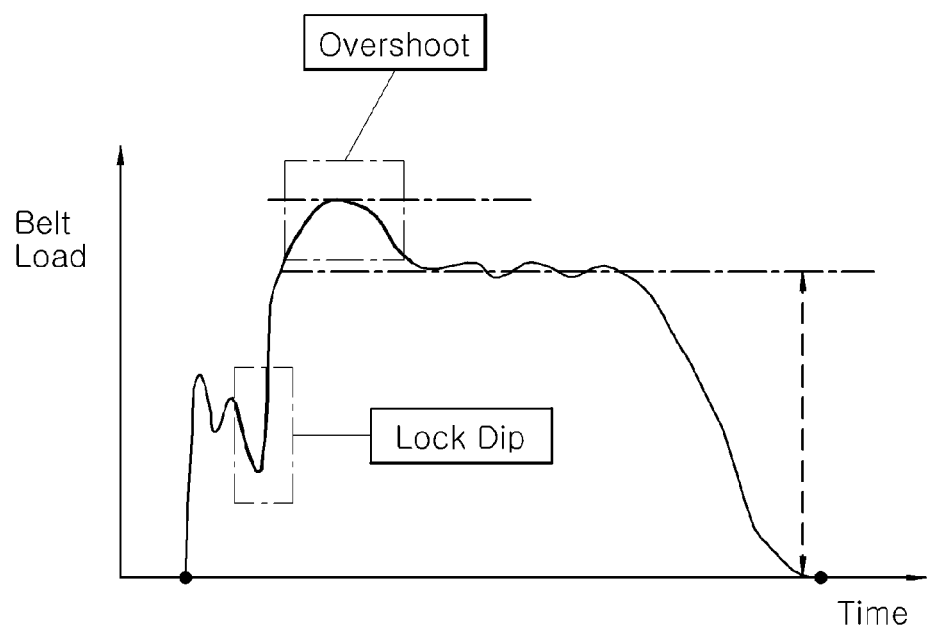
FIG. 1 is a graph showing a change of a belt load over time in a load limiter of the related art.
Figure 2:
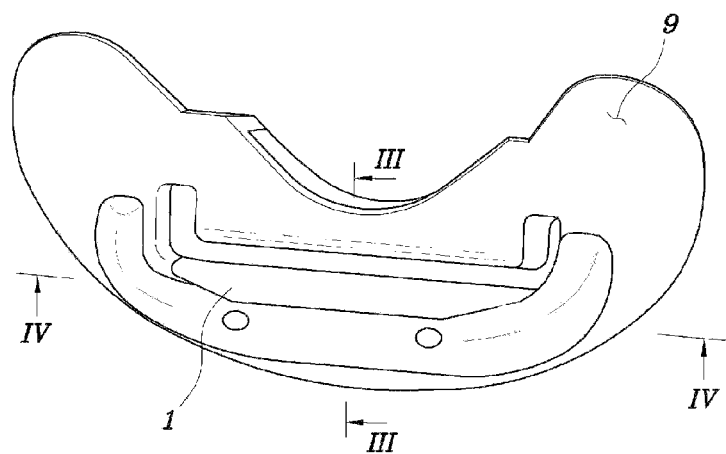
FIG. 2 shows a D-ring that is a safety device for a vehicle according to an exemplary embodiment of the present invention.
Figure 3:
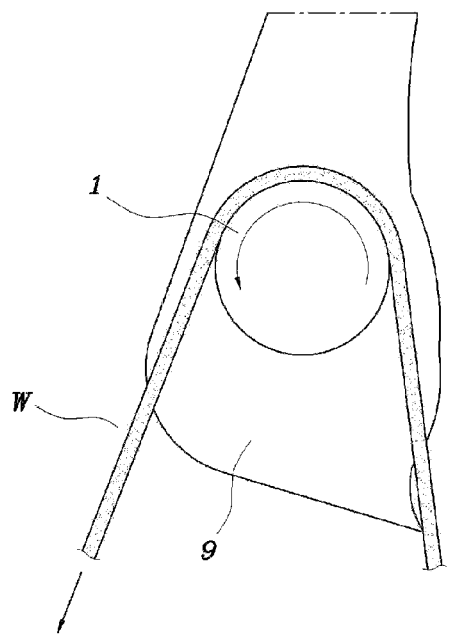
FIG. 3 is a cross-sectional view taken along line III-III of FIG. 2.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in greater detail to an exemplary embodiment of the present invention with reference to the accompanying drawings.

Referring to FIGS. 2 to 6, a safety device for a vehicle according to an exemplary embodiment of the present invention includes a roller 1 coming in contact with a webbing W and configured to rotate with movement of the webbing, an electric generator 3 configured to generate an electric current via the rotation of the roller 1, a magnetic force generator configured to generate a magnetic force via the electric current generated by the electric generator 3, and a resistance force generator 7 configured to provide a resistance force to the rotation of the roller 1 based on a shear force altered by the magnetic force generated by the magnetic force generator.

In detail, when a load is applied to the webbing of a seat belt due to a vehicle collision, thereby causing the webbing to move, the roller 1 is rotated by the webbing, and thus electric current is generated by the electric generator 3. As a result, the magnetic force generator generates a magnetic force. The magnetic force generates the resistance force, which inhibits the rotation of the roller 1, from the resistance force generator 7, thereby inhibiting the rotation of the roller 1. Furthermore, the reference load by which the movement of the webbing is restricted is ultimately changed by a movement speed of the webbing. Since the movement speed of the webbing is changed by a collision speed of the vehicle, the reference load that constrains and releases the webbing according to the collision speed of the vehicle is changed, and thereby optimal stability is provided to the occupant.

In the exemplary embodiment of the present invention, the safety device is substantially configured as a D-ring 9 mounted on a pillar section of the vehicle. The roller 1 is installed so as to form a part through which the webbing of the D-ring 9 passes with the webbing wound therearound. The electric generator 3, the magnetic force generator, and the resistance force generator are mounted in the D-ring 9.

In addition to the D-ring, any ring-shaped structure having a aperture through which the webbing passes may be equipped with the roller 1, the electric generator 3, the magnetic force generator, and the resistance force generator 7, and be thereby configured as the safety device according to the exemplary embodiment of the present invention.

The electric generator 3 includes permanent magnets 3-1 integrally provided to the roller 1, and current generating coils 3-2 surrounding the permanent magnets 3-1. The magnetic force generator is made up of magnetic force generating coils 5 installed around the resistance force generator 7 to generate the magnetic force from the current generating coils 3-2. Thus, when the roller 1 is rotated, the permanent magnets 3-1 are rotated, and thus electric current is generated from the current generating coils 3-2 by an electromagnetic induction phenomenon. The electric current generated in this way is supplied to the magnetic force generating coil 5 so as to cause a magnetic force to be generated by the magnetic force generating coil 5.

The resistance force generator 7 includes magneto-rheological fluid 7-1 filled around a part of the roller 1, and blade sections 7-2 protruding from the roller 1 in a circumferential direction of the roller 1 so as to be rotated in the magneto-theological fluid 7-1. Thus, according to an extent to which the magnetic force is applied to the magneto-rheological fluid 7-1, a shear force of the magneto-rheological fluid 7-1 is changed/altered. According to the change of the shear force of the magneto-rheological fluid 7-1, the rotation of the blade sections 7-2 of the roller 1 is changed. Consequently, the rotation of the roller 1 can be controlled.

Figure 4:
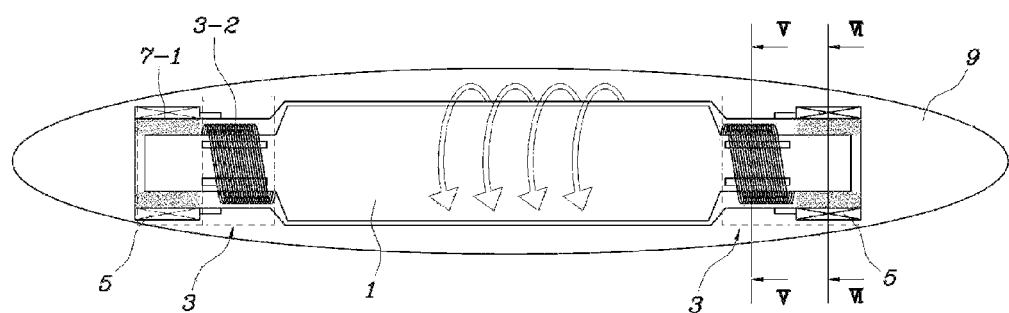
FIG. 4 is a cross-sectional view taken along line IV-IV of FIG. 2.
Figure 5:
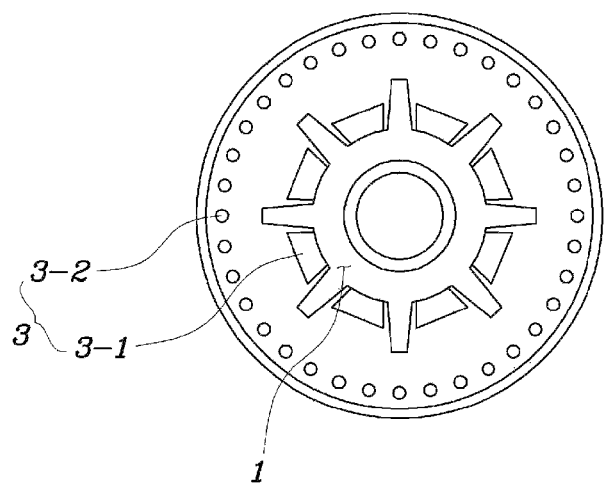
FIG. 5 is a cross-sectional view taken along line V-V of FIG. 2.
Figure 6:
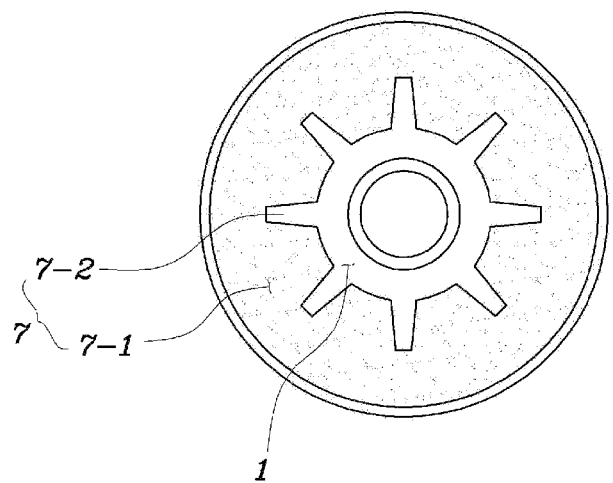
FIG. 6 is a cross-sectional view taken along line VI-VI of FIG. 2.

The electric generator 3 and the resistance force generator 7 may be configured so as to be installed on the roller 1 adjacent to each other at a position deviating from the portion when the webbing is in contact with the roller 1 while surrounding the part of the roller 1. In the exemplary embodiment, as shown in FIG. 4, both the electric generator 3 and the resistance force generator 7 are provided on opposite sides of the roller 1.

Figure 7:
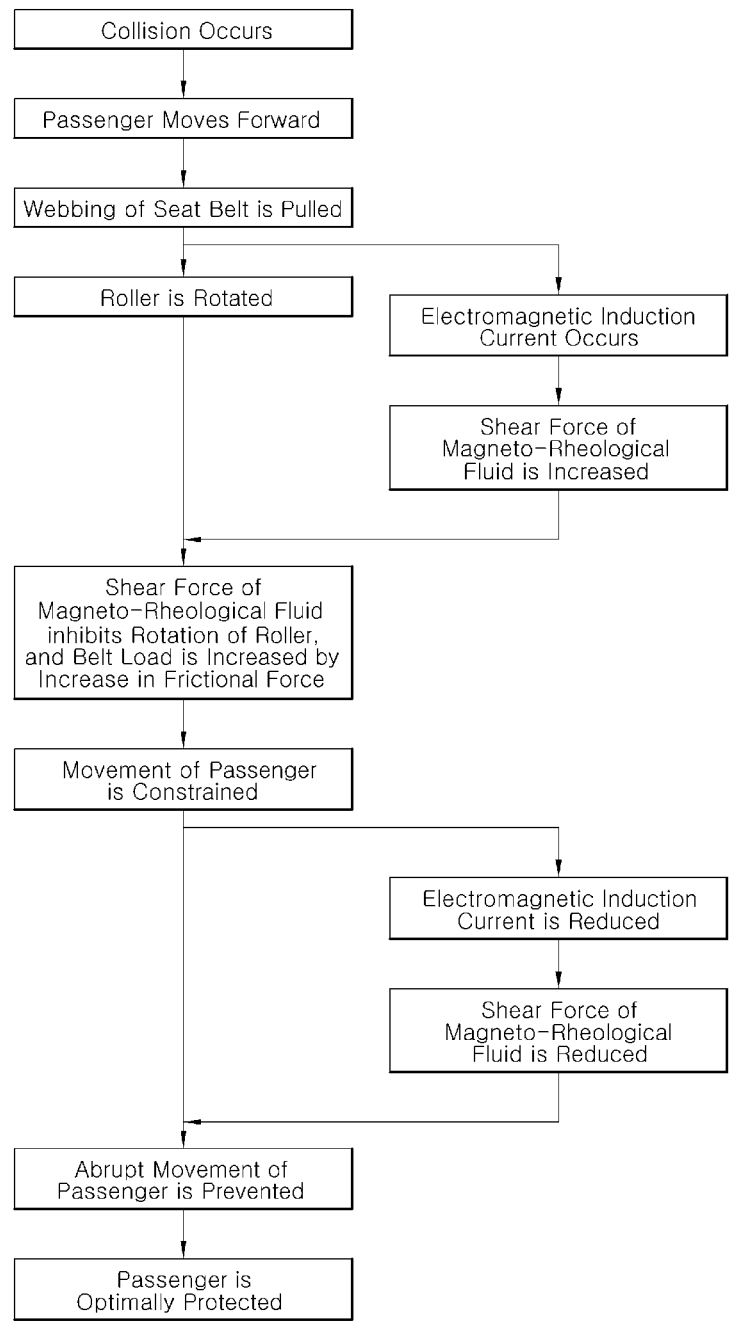
FIG. 7 is a block diagram describing an operation of the safety device according to the exemplary embodiment of the present invention.

FIG. 7 illustrates the operation of the present invention configured as described above. When a collision occurs and a passenger moves forward, the webbing is pulled. When the roller 1 is rotated by the movement of the webbing, the electric current is generated from the current generating coils 3-2, and the shear force of the magneto-theological fluid 7-1 is increased. Thus, the rotation of the roller 1 is inhibited to constrain the movement of the passenger.

Particularly, when the rotation of the roller 1 is inhibited to constrain the movement of the passenger, the electric current generated from the current generating coils 3-2 is reduced, and the shear force of the magneto-theological fluid 7-1 is reduced. As such, abrupt movement of the passenger is prevented, and an optimal function of protecting the passenger can be performed.

Figure 8:
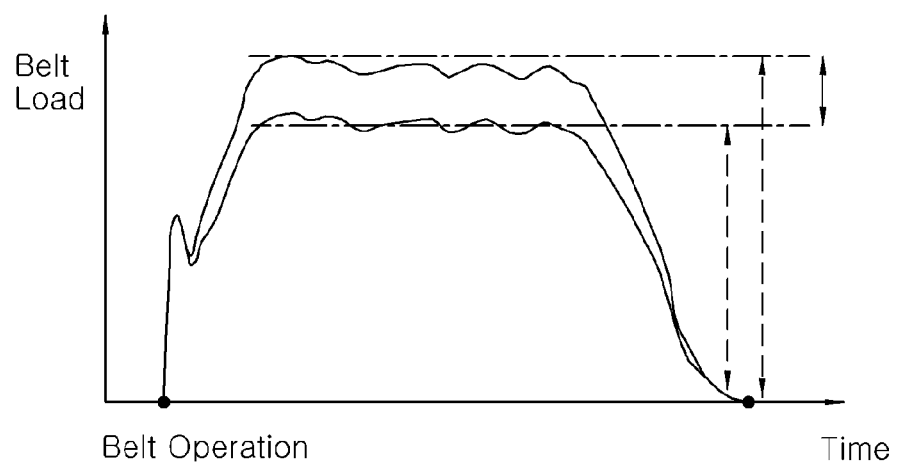
FIG. 8 is a graph describing a characteristic of the safety device according to the exemplary embodiment of the present invention.

FIG. 8 shows a characteristic of the safety device for the vehicle according to the exemplary embodiment of the present invention. It is expressed that the reference load releasing the webbing is changed according to the change of the collision speed.

Although a specific embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A safety device for a vehicle comprising:
   a roller making contact with a webbing and configured to rotate with movement of the webbing;
   an electric generator configured to generate electric current via rotation of the roller;
   a magnetic force generator configured to generate a magnetic force via the electric current generated by the electric generator; and
   a resistance force generator configured to provide a resistance force to the rotation of the roller based on a shear force altered by the magnetic force generated by the magnetic force generator.

2. The safety device according to claim 1, wherein:
   the electric generator includes permanent magnets integrally provided to the roller, and current generating coils surrounding the permanent magnets; and
   the magnetic force generator includes magnetic force generating coils installed around the resistance force generator to generate the magnetic force from the current generating coils.

3. The safety device according to claim 1, wherein the resistance force generator includes magneto-theological fluid filled around a part of the roller, and blade sections protruding from the roller in a circumferential direction of the roller to be rotated in the magneto-rheological fluid.

4. The safety device according to claim 1, wherein the electric generator and the resistance force generator may be configured to be installed on the roller adjacent to each other at a position deviating from a portion where the webbing is in contact with the roller while surrounding a part of the roller.

5. The safety device according to claim 1, wherein the roller, the electric generator, the magnetic force generator, and the resistance force generator are mounted on a ring-shaped structure having a aperture through which the webbing passes.

6. The safety device according to claim 1, wherein:
   the safety device is configured as a D-ring mounted on a pillar section of the vehicle, and the roller is installed so as to form a part through which the webbing of the D-ring passes with the webbing wound therearound; and the electric generator, the magnetic force generator, and the resistance force generator are mounted in the D-ring.

* * * * *